United States Patent [19]

Bowman et al.

[11] 4,178,987

[45] Dec. 18, 1979

[54] MOVING BED HYDRIDE/DEHYDRIDE SYSTEMS

[75] Inventors: Walker H. Bowman, St. Charles; Bruce E. Sirovich, Naperville, both of Ill.

[73] Assignee: Standard Oil Company, a corporation of Indiana, Chicago, Ill.

[21] Appl. No.: 923,805

[22] Filed: Jul. 12, 1978

[51] Int. Cl.$^2$ .............................................. F28D 15/00
[52] U.S. Cl. ............................................. 165/1; 62/2; 62/4; 62/48; 126/263; 165/107 D; 165/DIG. 17; 423/644; 423/648 R
[58] Field of Search ................ 62/2, 4, 48; 126/263, 126/270; 165/1, 2, 107, DIG. 17

[56] References Cited

U.S. PATENT DOCUMENTS

| | | | |
|---|---|---|---|
| 3,922,872 | 12/1975 | Reilly et al. | 62/48 |
| 3,943,719 | 3/1976 | Terry et al. | 60/644 |
| 4,039,023 | 8/1977 | McClaine | 165/2 |
| 4,044,819 | 8/1977 | Cottingham | 165/1 |
| 4,055,962 | 11/1977 | Terry | 62/102 |

*Primary Examiner*—Leland A. Sebastian
*Attorney, Agent, or Firm*—Ronald C. Petri; Arthur G. Gilkes; William T. McClain

[57] ABSTRACT

Moving bed hydride heat pumps and pressure pumps are described in which a hydride-forming material is transported between two or more reactor vessels. Each vessel can be maintained at a predetermined temperature, and thus, the hydride-forming material may be heated or cooled by moving it into an appropriately heated or cooled reactor vessel. In this way thermal cycling of reactor vessels is reduced or eliminated. Both continuously operating and moving batch hydride pumping systems are disclosed.

40 Claims, 11 Drawing Figures

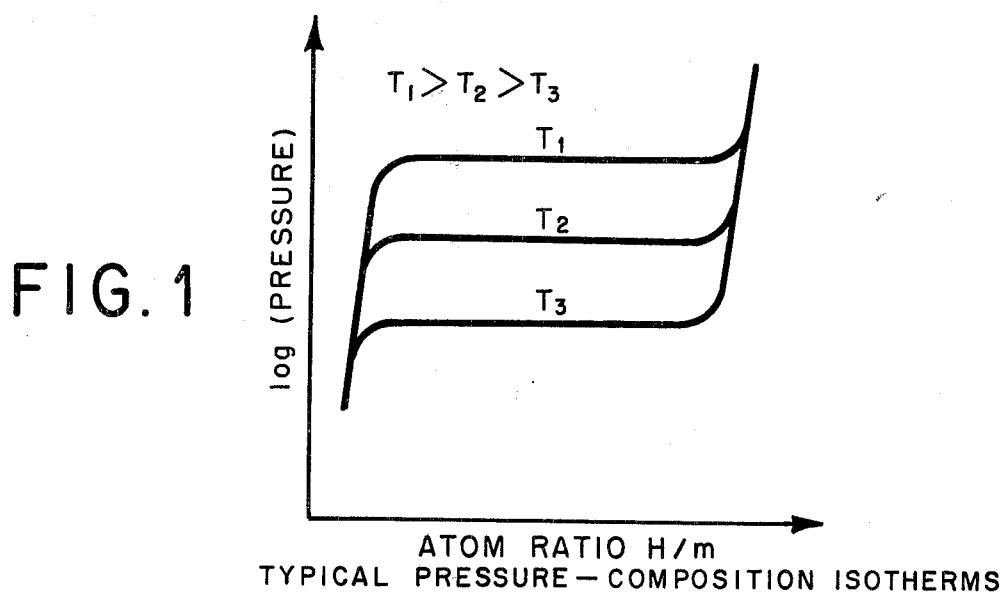
FIG. 1
TYPICAL PRESSURE—COMPOSITION ISOTHERMS
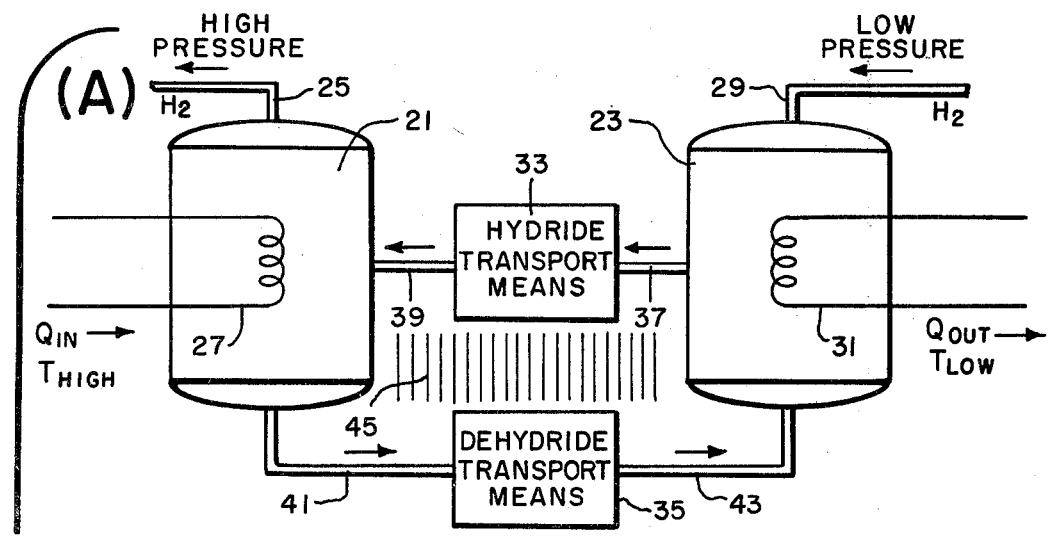
FIG. 2
MOVING HYDRIDE PRESSURE PUMP
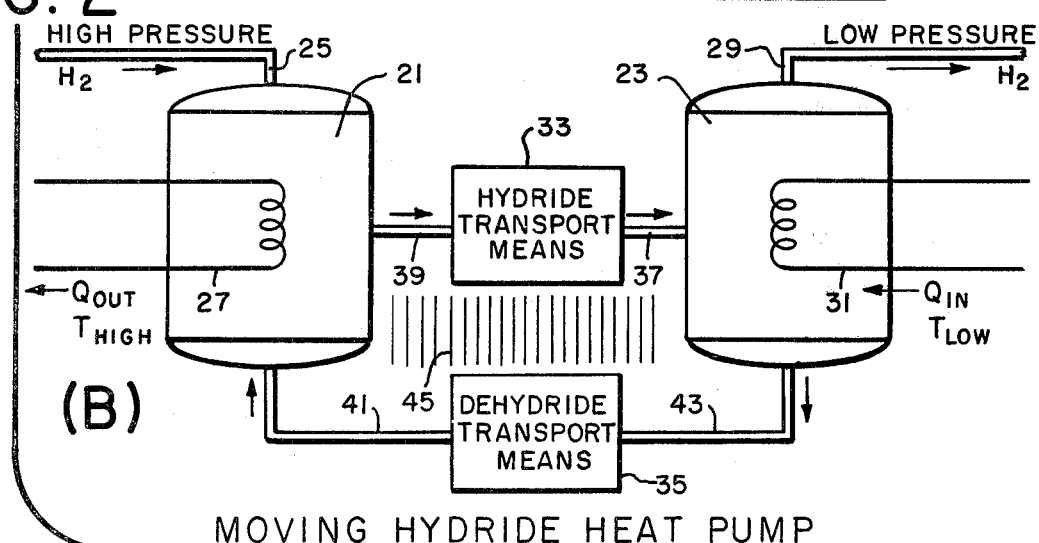
MOVING HYDRIDE HEAT PUMP

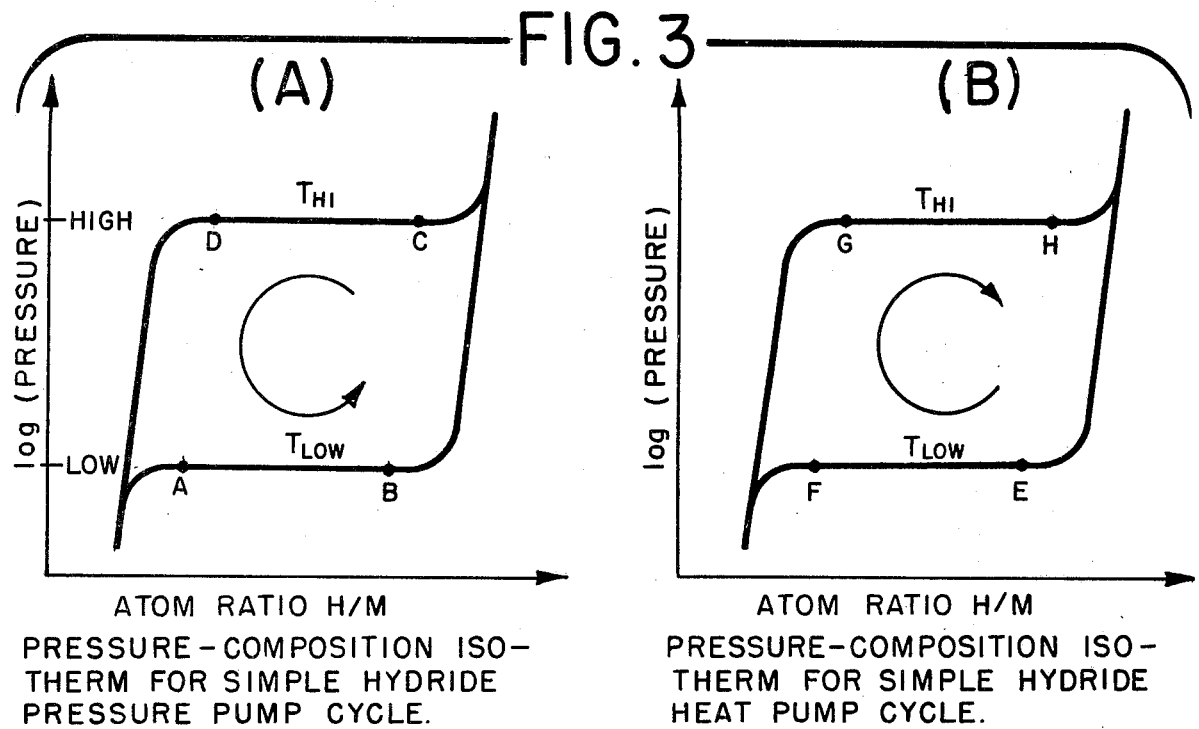
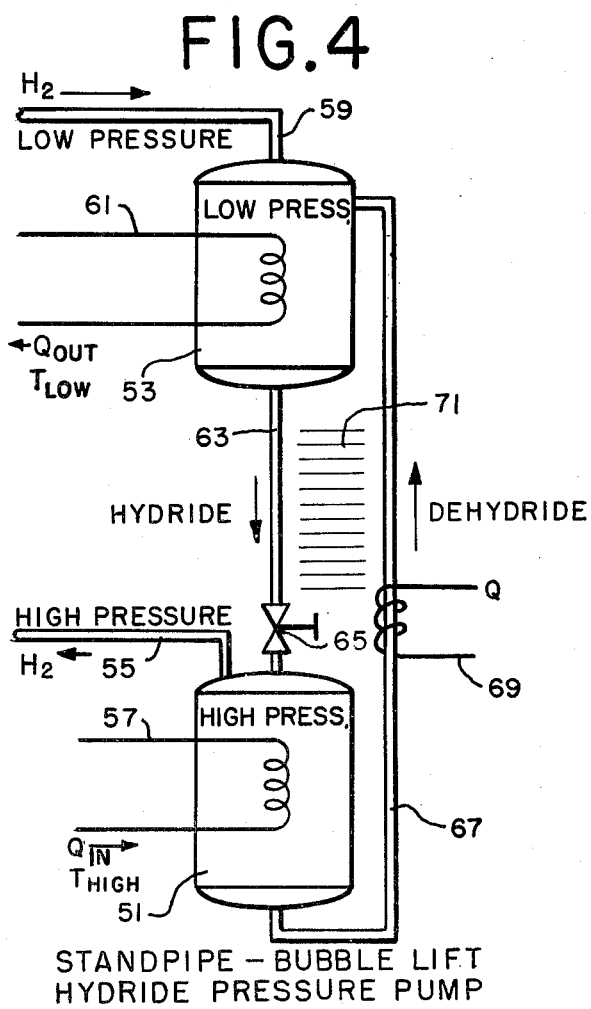
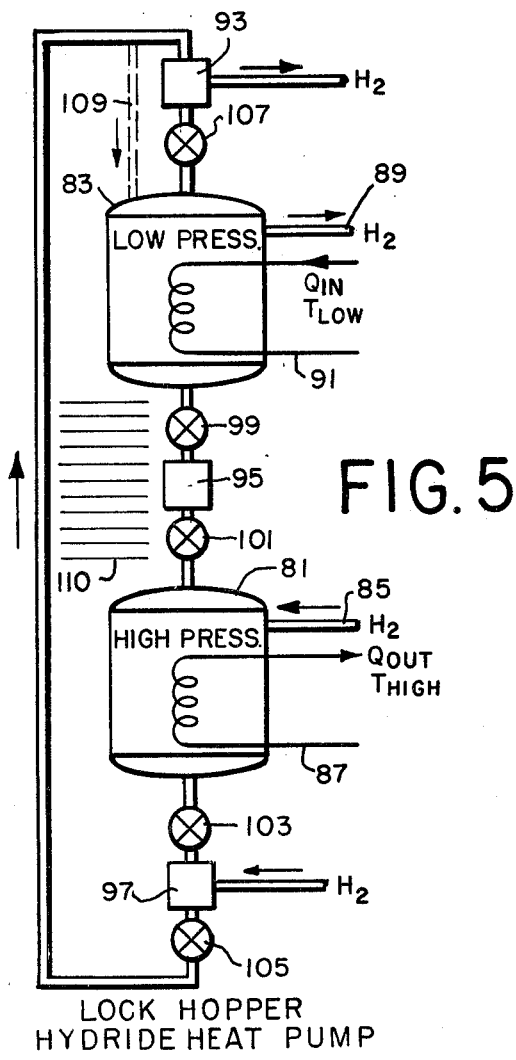

SLURRY OR SOLIDS PUMP
HYDRIDE PRESSURE PUMP

MOVING BATCH HYDRIDE HEAT PUMP

HYDROGEN PURIFICATION PUMP

MOVING BED HYDRIDE/DEHYDRIDE SYSTEMS

BACKGROUND OF THE INVENTION

1. Field of the Invention

This invention relates to heat pumps and pressure pumps of the type in which hydride-forming materials are thermally cycled in order to achieve the desired pumping action. More specifically, this invention relates to hydride pumping devices in which the hydride-forming material is cyclically transported between a high temperature/high pressure environment and a low temperature/low pressure environment. Both continuously operating and moving batch hydride transport systems are disclosed.

2. Description of the Prior Art

Various types of pumping devices employing hydrides have been proposed to pressurize hydrogen (pressure pumps) and to transport heat energy from a given input temperature to a higher output temperature (heat pumps). Hydrides have the ability to chemically store large quantities of hydrogen in a concentrated form at a variety of temperatures and pressures, and then to release the stored hydrogen when heat is added to the hydride. Numerous hydride-forming materials have been identified, and recently various hydrides, especially metal hydrides, have received considerable attention for potential use in heat and pressure pumps. As used herein, the term "hydride forming material" is used to refer generally to materials capable of absorbing and desorbing hydrogen, in both the hydrided and the dehydrided states.

In U.S. Pat. No. 4,055,962 to Terry, a hydride heat pump is disclosed in which a number of reactor vessels are used to contain fixed beds of hydride-forming materials. These vessels and the contained hydrides are thermally cycled to hydride and then dehydride the hydride-forming materials. Individual vessels are cycled in staggered sequence so that an approximation of continuous operation is provided.

Similarly, U.S. Pat. No. 4,044,819 to Cottingham discloses another hydride heat pump which also employs fixed beds of hydride contained in reactor vessels. Once again, the entire reactor vessel is thermally cycled in order to achieve the desired thermal cycling of the contained hydrides. The disclosed device operates in a cycle in which each bed of hydride is used to alternately absorb and then desorb hydrogen, and once again, semi-continuous operation is only achieved by multiplying the number of hydride beds and operating them in staggered phase.

U.S. Pat. No. 3,943,719 to Terry and Schoeppel discloses yet another discontinuous, fixed batch hydride pump in which reactor vessels are thermally cycled and multiple, staggered-cycle, hydride beds are used to achieve continuous pressure pumping.

Significantly, none of the above-referenced prior art is capable of achieving continuous pumping action without resorting to multiple, staggered cycle hydride beds. Such staggered bed systems are relatively complex devices employing multiple valves, reactor vessels, and heat exchangers. In addition, the art does not contemplate the use of means for avoiding the thermal cycling of reactor vessels. In each case, both the reactor vessels and the contained hydrides are thermally cycled together. This thermal cycling of major structural components brings with it several disadvantages. Sensible heat is required to periodically heat the thermal mass of the reactor vessels. This heat is only partially recovered as the temperature of the vessels is cycled, resulting in a reduction in the thermodynamic efficiency of the hydride pump. Secondly, the thermal cycling of the reactor vessels will, in many cases, induce severe mechanical stress and strains which may result in accellerated mechanical failure. Furthermore, these reactor vessels are routinely exposed to hydrogen, and thermal cycling in the presence of hydrogen accelerates hydrogen embrittlement of many metals. Thus, hydrogen embrittlement of reactor vessels and associated maintenance problems are exacerbated.

SUMMARY OF THE INVENTION

This invention overcomes many of these and other drawbacks of the prior art by providing means by which a hydride pump can be made to pump either hydrogen or heat without thermally cycling individual reactor vessels between the extreme temperatures over which the pump operates. Furthermore, this invention encompasses continuously operating hydride pumps which do not require a number of individual, staggered cycle pumps utilizing fixed beds of hydride-forming material.

This invention goes beyond the thermally cycled fixed hydride beds of the prior art. According to this invention, the hydride-forming material itself is transported between two or more reaction zones. Each reaction zone can be maintained at a desired temperature and/or pressure, and thus, the hydride-former can be heated or cooled by moving it into an appropriately heated or cooled reaction zone. The thermodynamic efficiency of the cycle is improved and thermal stresses and hydrogen embrittlement of component parts of the pump such as reactor vessels are reduced by reducing thermal cycling. According to this invention, heat is supplied to a hydride-forming material in a first reaction zone to promote desorption of hydrogen at a first temperature. Then the fully or partially dehydrided material is transported to a second reaction zone where heat is drawn off at a second temperature to promote absorption of hydrogen. The fully or partially hydrided material is then returned to the first reaction zone to complete the hydride cycle. Of course, it should be understood that the moving hydride methods of this invention are not limited to use with two reaction zones, and may be applied to hydride/dehydride cycles employing three or more reaction zones as well.

The improvements of this invention can be applied to either continuous or moving batch hydride pumps. Various methods can be used to transport the hydride-forming material between vessels, including fluidized flow, slurry pumping, and solids pumping. Conveyors, rotary feeders, and screw lifts are only a few of the solids pumps which may be used with this invention. These improvements are applicable to a wide range of hydride pumps, including single and multiple stage hydride pumps operating as pressure pumps, hydrogen purification pumps, and heat pumps. The invention itself, together with further objects and attendant advantages, will be best understood by reference to the following description taken in connection with the accompanying drawings.

BRIEF DESCRIPTION OF THE DRAWINGS

FIG. 1 is a schematic diagram of typical pressure-composition isotherms for an idealized hydride-forming material.

FIGS. 2a and 2b are flow diagrams for preferred embodiments of the moving hydride pressure pump and heat pump of this invention.

FIGS. 3a and 3b are schematic diagrams of idealized pressure-composition curves for the pumping cycles of FIGS. 2a and 2b, respectively.

FIG. 4 is a flow diagram of a preferred embodiment of a moving hydride pressure pump including a standpipe-bubble lift hydride transport apparatus.

FIG. 5 is a flow diagram of a preferred embodiment of a moving hydride pressure pump including a lock hopper hydride transport apparatus.

DETAILED DESCRIPTION OF PREFERRED EMBODIMENTS

Operating Principles

Figure 6:
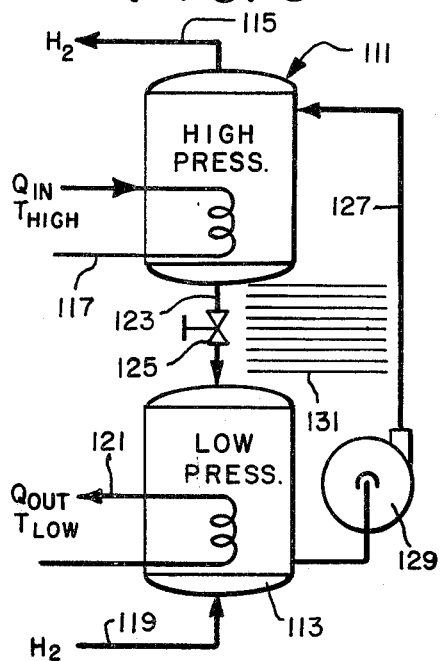
FIG. 6 is a flow diagram of a preferred embodiment of a moving hydride pressure pump including a slurry pump or solids pump hydride transport apparatus.

The hydride-forming materials used in this invention are materials which are capable of storing and then releasing substantial quantities of hydrogen under appropriate conditions of temperature and hydrogen pressure. As used herein, the term "hydrogen" is meant to include all isotopes of hydrogen, including deuterium and tritium, for example.

Typically, each hydride-former possesses an equilibrium temperature which is a function of hydrogen pressure. When the hydride-former is heated to a temperature greater than the equilibrium temperature and heat is further supplied, the hydride will begin to decompose, giving off previously absorbed hydrogen. Conversely, the hydride-former will absorb hydrogen when its temperature is lowered below the equilibrium temperature characteristic of the prevailing hydrogen pressure and heat is further removed. Thus, by adjusting the temperature of and hydrogen partial pressure over a hydride-forming material and supplying or removing heat as appropriate, the quantity of hydrogen stored in the hydride can be varied. The materials of primary interest in this context are those which are exothermic absorbers of hydrogen. For these, appreciable quantities of heat are released as the material absorbs hydrogen.

Most of the preferred hydride-forming materials are either metal alloys or pure metals which are capable of storing large quantities of hydrogen in the metallic lattice. The amount of hydrogen stored in the lattice can be expressed as the atom ratio, $H/m$, where H is the number of hydrogen atoms and m is the number of metal atoms. A useful characteristic of many hydride-formers, including many of the metallic hydride-formers, is that, for a given equilibrium temperature, the equilibrium pressure is approximately constant for a wide range of the hydrogen capacity of the hydride-former during the hydriding or dehydriding cycle. In terms of the atom ratio, this means that, for a given temperature, these materials are substantially isobaric for a wide range of $H/m$ values. Hydride-formers which are suitable for use in the invention include, but are not limited to, alloys, mixtures, and intermetallic compounds of nickel-magnesium, lanthanum-nickel, calcium nickel, iron-titanium-nickel, titanium-nickel, as well as niobium, scandium and vanadium metal. Also suitable are hydrocarbon compounds with unsaturated carbon-carbon bonds that can accept and subsequently release hydrogen under proper conditions. Other suitable materials are disclosed in the literature, as, for example, in U.S. Pat. Nos. 4,055,962 (Terry), 4,044,819 (Cottingham), 4,039,023 (McClaine), and 3,943,719 (Terry, et al).

FIG. 1 presents an idealized diagram of generally typical isotherms for a preferred hydride-former suitable for use in this invention. These materials possess isobaric equilibrium regions in which, for a given equilibrium temperature, the equilibrium pressure is substantially constant over a wide range of hydrogen concentration. It should be understood that it is the partial pressure of hydrogen, not the total pressure, which is depicted in diagrams such as FIG. 1. As used herein, all pressures refer to partial pressure of hydrogen unless otherwise indicated. Materials most useful in this invention possess plateau regions which are substantially isobaric for a range of $H/m$ of about 0.10 or greater. Such materials can be made to absorb or desorb large quantities of hydrogen at fixed temperature and pressure by merely controlling the flow of heat and hydrogen into the vicinity of the material.

The equilibrium temperature for a given pressure is not the same for all hydride-forming materials. On the contrary, different hydride-formers exhibit widely ranging equilibrium temperatures for a given pressure, and it is this variation that permits the use of two or more hydride-formers in combination in heat pumping schemes. For hydride-formers useful in this invention, higher equilibrium temperatures are generally associated with higher hydrogen pressures.

The Basic Hydride/Dehydride Cycles

Hydride-forming materials can be used to construct both heat pumps and pressure pumps utilizing hydride/dehydride cycles. Such devices have, in the past, been built using fixed beds of hydride-forming materials which are thermally cycled to produce the desired pumping action. In the present invention the hydride-forming materials themselves are moved from one reaction zone to another, thereby reducing the thermal cycling of the reactor vessels. Hydride pumps in which hydride-forming material is moved from one reaction zone to another are generally referred to as moving bed hydride pumps herein. Transport methods for moving the hydride-former, as well as particular advantages and applications of these methods, will be discussed below, but first the two basic hydride/dehydride cycles will be described.

The most basic hydride/dehydride cycles utilizing moving beds of hydride-former can be operated as pressure pumps and heat pumps. FIG. 2a schematically depicts a moving hydride pressure pump. This pressure pump includes a high pressure/high temperature reaction vessel 21 and a low pressure/low temperature reaction vessel 23. The high-pressure vessel 21 is provided with a conduit 25 for conducting high-pressure hydrogen out of the vessel 21 and a heat exchanger 27 for transferring high temperature heat into the vessel. Similarly, the low-pressure vessel 23 is coupled to a source of low-pressure hydrogen via a conduit 29 and to a low-temperature heat sink via a heat exchanger 31. The two vessels 21,23 are partially filled with a hydride-forming material, and this material is cycled between the two vessels 21,23 by a hydride transport means 33, which transports substantially hydrided material through conduits 37,39 in the direction shown, and a dehydride transport means 35, which feeds substantially dehydrided material in the reverse direction through conduits 41,43. Preferably, a counter current heat exchanger 45 is used to thermally couple the two moving streams of hydride-forming material so that a portion of the thermal energy of hydride-forming material leaving the high temperature vessel 21 can be recovered and used to heat the hydride-forming material entering the vessel 21.

With the transport means 33,35 in operation, the hydride-forming material moves in a counterclockwise direction in a continuous cycle. FIG. 3a is an idealized representation of the hydride/dehydride cycle that is carried out in the pressure pump of FIG. 2a. Point A in FIG. 3a represents the state of dehydrided material as it enters the low-pressure reaction vessel 23; the hydrogen content, pressure, and temperature of the material are all at low levels. However, this material absorbs hydrogen as it remains in the vessel 23. Low pressure hydrogen is taken up by the material in an exothermic reaction. Heat energy is removed from the vessel 23 by heat exchanger 31 to maintain the hydriding material at the desired low temperature. As the hydrogen content of the hydride-forming material increases, the material moves from A to B in FIG. 3a.

Once the material is substantially fully hydrided, it is transported to the high-pressure vessel where it is heated by the heat exchanger 27 to a higher temperature. At this higher temperature, the equilibrium hydrogen pressure is higher than before, and high pressure hydrogen can be drawn off via conduit 25, thereby moving the hydride from C to D in FIG. 3a. The heat exchanger 27 supplies the high temperature heat which drives the endothermic dehydriding process. After the material has been substantially dehydrided, it is returned from the high-pressure vessel 21 to the low-pressure vessel 23 to repeat the cycle. From this description of the pressure pump of FIG. 2a, it can be seen that the pump utilizes the transport of heat from a higher temperature to a lower temperature to compress hydrogen.

The hydride/dehydride cycle of FIGS. 2a and 3a can be reversed, and when reversed, it functions as a heat pump rather than a pressure pump. High pressure hydrogen is used to transport heat energy from a low temperature heat source to higher temperature. FIG. 2b shows such a moving hydride heat pump. This heat pump is very similar to the pressure pump of FIG. 2a except that the flow of hydride-former, heat, and hydrogen is reversed. Here, hydrided material enters the low-pressure vessel 23 through conduit 37. Low pressure hydrogen is drawn off through conduit 29, and this endothermic reaction is driven by low temperature heat supplied by the heat exchanger 31. In terms of FIG. 3b, the material moves from E to F as it desorbs hydrogen at low temperature and pressure.

When substantially dehydrided, the material is transported via conduits 43,41 to the high-pressure vessel 21, where the hydride-former is subjected to high pressure hydrogen and absorbs hydrogen. The exothermic absorption process releases higher temperature heat which is removed by the heat exchanger 27. The hydride-former moves from G to H in FIG. 3b as it absorbs hydrogen. After the material is substantially hydrided it is returned to the low-pressure vessel 23 through conduits 39,37 to start the cycle once again. The hyride/dehydride pump cycle is driven by high pressure hydrogen to pump heat from a low temperature heat source to a higher temperature heat sink.

The composition curves of FIGS. 3a and 3b are somewhat idealized in that hysteresis effects have been ignored. In general, actual pressure-composition curves show that, for a given temperature, absorption will take place only at a pressure somewhat higher than the pressure at which desorption will occur. This effect will detract from the overall efficiency of the pump and may necessitate either raising the desorption temperature or pressure or lowering the absorption temperature or pressure. The resulting efficiency loss can be kept small by careful selection of the hydride-forming material. Some hydrides demonstrate marked hysteresis effects, while in others the effects are almost negligible.

The composition curves of FIG. 3a and 3b are further idealized in that isotherms for any given hydride former may not display a completely flat plateau region of constant pressure over a wide range of H/m values. Such deviations from completely isobaric behavior for some range of H/m will affect the overall efficiency of the hydride cycle. The preferred hydride-forming materials are those possessing isotherms with a large substantially isobaric region. Hydrides with smaller plateaus, or slightly nonisobaric regions, may also be used, however.

Several means for transporting hydride-forming materials are described below, as well as particular applications. These transport means include both continuous transport and moving batch systems which offer important advantages over the fixed batch systems of the prior art in terms of efficiency, reliability, and simplicity of design. Because the reactor vessels and heat exchangers can be maintained at substantially constant temperatures in the moving hydride systems of this invention, thermal efficiency is improved. In the prior art fixed batch systems, reactor vessels and heat exchangers were alternately heated and cooled, and this thermal cycling reduced operating efficiency. Improved reliability is also provided by the moving hydride systems of this invention, for thermal stresses and strains as well as hydrogen embrittlement of reactor vessels are accelerated by such thermal cycling. Therefore, a reduction in thermal cycling simultaneously improves efficiency and reduces both thermal stresses and strains and hydrogen embrittlement.

A third important advantage of the continuous moving hydride systems described below is that they operate to pump either heat or hydrogen continuously. Thus, simple systems can be designed to operate continuously without the need for multiple hydride beds which are operated in staggered cycles to provide what is at best only an approximation of continuous operation.

Transport Methods

Several different approaches may be used in moving hydride-forming materials from one reactor vessel to another. The preferred methods are fluidized flow, slurry pumping, and solids pumping, and these methods may be used in either continuously operating or moving batch hydride pumps. As used herein, the term "hydride pump" encompasses the entire range of devices which thermally cycle hydride-forming material to achieve a pumping action. Heat pumps and pressure pumps utilizing the cycles described above, as well as pumps for transferring hydrogen from one vessel to another, as described below, are included in the term.

FIG. 4 is a schematic representation of a preferred embodiment of a fluidized flow hydride pump which is capable of continuous operation. Many of the hydride-forming materials suitable for use in this invention spontaneously fragment into a powder after repeated thermal cycling. The size of individual particles of the powder is largely a function of the inherent mechanical properties of the hydride-former during cycling in a hydrogen-rich environment. Some of the hydride-forming metals exhibit spontaneous sintering, and the average particle size for these materials may result from a dynamic balance between the competing processes of particle growth (sintering or agglomeration or other such processes) and particle break-up (crumbling). For many of these materials, the average particle diameter is expected to fall within the range of one to fifty microns.

In fluidized flow a moving fluid is used to translate a solid in the direction of fluid flow. The fluid velocity necessary to fluidize a powder of a known density and size can be determined through standard engineering principles. In general, there are several advantages of small particle size. Heat transfer rates are typically greater for smaller particles and the fluid velocity required to fluidize smaller particles is lower. Interparticle cohesion and gas-solid separation, on the other hand, may present increased difficulties as particle size is decreased. For any given application, the preferred particle size and fluidizing fluid velocity will probably vary according to the properties of the hydride-forming material used. The terms "fluidized" and "fluidized flow" are used herein to designate a wide variety of transport methods in which solids are entrained in a flowing fluid. The terms should be understood to include transport methods in which some means in addition to flowing fluid is used to agitate or disperse the solid as well as transport methods in which flowing fluid alone separates and translates the solid. For example, mechanical means such as paddles, acoustical means, or electromechanical means can be used in conjunction with flowing fluid to achieve fluidized flow.

A wide range of fluids may be used to fluidize hydride-formers. The principal considerations are that the fluid should be characterized by high rates of heat transfer and hydrogen transfer, and that it not poison or significantly impede the hydride-forming capability of the hydride-former. The preferred fluid is hydrogen, which is easily stored in a hydride system, is characterized by a high heat transfer rate, and of course has a minimal poisoning effect on the hydride-former.

Referring now to FIG. 4, a preferred embodiment of a continuous hydride pressure pump includes a high pressure/high temperature reaction vessel 51 and a low pressure/low temperature reaction vessel 53, both of which contain a suitable hydride-forming material. High pressure hydrogen is removed from the high pressure vessel 51 through a conduit 55 and high temperature heat is introduced through a heat exchanger 57. Similarly, low pressure hydrogen is introduced into the low pressure vessel 53 through conduit 59 and low temperature heat is removed therefrom through heat exchanger 61.

A conduit or standpipe 63 provided with a throttling means such as throttle valve 65 is connected between the two pressure vessels 51,53, which are so oriented that the low pressure vessel 53 is positioned above the high pressure vessel 51 and that the weight of fluidized hydride in the standpipe is sufficient to maintain the desired pressure differential between the upper and lower vessels 53,51. A second conduit or standpipe 67 is also provided between the upper and lower vessels 53,51 and is arranged to operate as a bubble lift. A heat exchanger 69 is coupled to some part of this second standpipe 67. The two standpipes are thermally linked by a counter current heat exchanger 71 which transfers heat from the rising stream of fluidized dehydrided material in the bubble lift 67 to the descending stream of fluidized hydride in the standpipe 63. This heat exchanger 71 can be a very simple device which simply provides a thermal link between the two streams of hydride-forming material. Heat recovery is easily implemented in the hydride pumps of this invention without using complex systems having moving heat exchange fluid and heat exchange pumps. Here, the hydride-forming material itself is in motion, and heat recovery can be accomplished merely by positioning the conduits containing the two streams of hydride-forming material adjacent one another and providing thermally conductive material between the conduits. In some embodiments a throttling means may be included in the bubble lift 67.

The hydride pressure pump of FIG. 4 is designed to operate continuously with a minimum of moving parts. The rate of circulation of the hydride-former between the upper and lower reactors is determined by the adjustment of the throttling means and the quantity of heat added to the dehydride in the bubble lift 67 through heat exchanger 69. Heat added to the dehydride through heat exchanger 69 causes the desorption of additional hydrogen, which forms "bubbles" in the fluidized dehydride. Alternately, lifting gases can be injected into the bubble lift to promote bubble formation. These bubbles reduce the total weight of material in the bubble lift and cause the dehydride to rise up through the bubble lift into the upper, low pressure reactor vessel 53. After remaining in the upper vessel 53 for a time period adequate to insure substantially complete hydriding, the material descends by force of gravity to the lower vessel 51.

The reactor vessels may be designed to utilize the excellent heat transfer characteristics and the rapid mixing of fluidized flow to insure that the reaction is substantially completed in a shorter time than the average residence time of material in the vessels 51,53. Alternately, the material may be passed through the vessels 51,53 as a stratified or plug flow, with the average velocity chosen to insure substantially complete reaction.

This embodiment of the invention has been illustrated with a hydride/dehydride cycle functioning as a pressure pump. Of course, hydride-forming materials can be transported as fluidized powder in standpipes and bubble lifts in heat pump cycles as well. An important advantage of this approach to hydride transport is that the number of moving parts is kept to a minimum. Since the weight of the column of fluidized hydride is used to maintain the pressure differential between the upper and lower vessels, the vertical separation between the two vessels must be selected to provide the desired total pressure difference. In many applications, and for many hydride/dehydride cycles, relatively large vertical separations may be required, and the bubble lift/standpipe approach to hydride-former transport is, therefore, expected to be specially applicable to large-scale commercial systems.

A second approach to the fluidized transport of hydride-formers is shown in FIG. 5. This approach utilizes lock hoppers instead of standpipes and bubble lifts and does not rely on the weight of a column of the hydride-former to maintain the pressure difference between two reactor vessels.

The embodiment of FIG. 5 includes a high pressure reactor vessel 81 provided with an input supply 85 of high pressure hydrogen and a heat exchanger 87 for extracting high temperature heat. A low pressure reactor vessel 83 is supplied with low temperature heat by a heat exchanger 91, and is coupled to a conduit 89 for removal of low pressure hydrogen. A plurality of smaller reservoirs 93,95,97 are connected to the vessels 81,83, and serve as lock hoppers. Valves 99,101,103,105,107 are provided to control flow between the various vessels and lock hoppers.

In this preferred embodiment the physically higher vessel 83 is constantly maintained at low pressure. Hydrided material is dropped into this vessel 83 at a physically high point in the vessel. As hydrogen is desorbed by this material, heat is absorbed from the heat exchanger 91. Dehydrided material migrates to the bottom of the vessel as dehydride is successively removed from the bottom of the vessel 83. A valve 99 is placed at the bottom of the vessel 83 between the vessel 83 and a lock hopper 95. Periodically, the valve 99 is opened to pass material from the vessel 83 into the lock hopper 95 and then closed.

Hydrogen may be added to pressurize the lock hopper 95, but this may not be necessary for proper operation of the device. At the base of the lock hopper 95 is another valve 101, which opens to the lower vessel 81. When this valve 101 is opened dehydride particles fall from the lock hopper into the lower vessel 81 and the valve 101 is then closed. High pressure hydrogen is introduced into the lower vessel 81 through a conduit 85. This hydrogen is absorbed by the hydride-forming material, which exothermically releases high temperature heat which is removed by the heat exchanger 87.

At the base of the lower vessel 81 is a valve 103 that opens into a lower lock hopper 97 into which loads of hydrided material are dropped. High pressure hydrogen is then introduced into the lock hopper 97, and after the valve 103 is closed the valve 105 is opened while high pressure hydrogen is passed into the lock hopper 97. Flowing hydrogen then carries the powdered hydride up to an upper lock hopper 93, which collects the hydrides. Hydrogen is drawn from this upper lock hopper 93 to readjust gas pressure before the valve 107 is opened to allow batches of powdered hydride to fall into the low pressure vessel 83. A counter current heat exchanger 110 thermally couples the hydride exiting the lock hopper 97 to the hydride-former in the lock hopper 95, thereby recovering a portion of the thermal energy of the hydride. In some applications it may be feasible to operate the device without the upper lock hopper by introducing the hydride from the lock hopper 97 directly into the low pressure vessel 83 through the conduit 109.

Though the lock hopper approach to hydride transport has been illustrated in connection with a hydride heat pump having a low pressure vessel situated above a high pressure vessel, it should be understood that this approach is equally applicable to hydride pressure pumps and to hydride pumps employing a high pressure vessel situated above the low pressure vessel. This approach utilizes gravitational forces to move the powdered hydride-former downward through the major portion of the cycle and fluidized flow to raise the hydride-former to complete the cycle.

By varying the relative size of the lock hoppers 93,95,97 with respect to the reactor vessels 81,83, the system can be designed to operate as either a continuously operating or a moving batch cycle. When the lock hoppers are used to transfer batches which are substantially smaller than the volume of hydride-former in either of the vessels 81,83, then the cycle proceeds in a nearly continuous fashion. In contrast, the lock hoppers can be sized to contain the entire contents of the vessels 81,83, in which case the cycle operates as a moving batch rather than a continuous system.

The lock hopper approach to hydride transport offers certain advantages over the standpipe/bubble lift approach. The device can be made on a smaller scale since the weight of the hydride-former is not relied on to generate the pressure differential of the system. On the other hand, the lock hopper approach requires a number of valves which must operate in a harsh environment which in many cases will include flowing particles, and considerable maintenance may be required to keep the valves functioning properly.

The two embodiments described above have both utilized fluidized particle flow to transport the hydride-forming material from one reactor vessel to another. Other preferred embodiments utilize other transport mechanisms, such as slurry and solids pumping. Alternately, it may be feasible to transport some hydride-forming materials between reactor vessels as liquids. In this case, a suitable liquids pump transport mechanism could be used. FIG. 6 shows a preferred embodiment of a hydride pressure pump which utilizes slurry or solids pumping.

The hydride pressure pump of FIG. 6 is similar to the pressure pump of FIG. 4 in many ways. Once again, the pump includes high- and low-pressure reactor vessels 111,113; high and low temperature heat exchangers 117,121; and high and low pressure hydrogen conduits 115,119, respectively. These elements are arranged in the same manner as in the previously described pressure pumps, except that in this case the relative positions of the high and low pressure vessels 111,113 are not constrained as they are in the bubble lift device of FIG. 4.

The device of FIG. 6 includes a conduit 123 interconnecting the vessels 111,113 for transporting hydride-forming material from the high pressure vessel 111 to the low pressure vessel 113. A throttling valve 125 is placed to control the rate of flow through the conduit 123. A second conduit 127 also connects the two vessels 111,113, and a pump 129 is placed to feed hydride-forming material from the low pressure vessel 113 to the high pressure vessel 111. A counter current heat exchanger 131 thermally couples the conduits 123,127.

The hydride-forming material contained in the vessels 111,113 is preferably a collection of subdivided particles. These particles may either be mixed with a suitable liquid to form a slurry or used as a granulated solid. Depending on whether a slurry or granulated solid is used, the pump 129 is either a slurry pump or a solids pump. Screw lifts, conveyors, rotary feeders, as well as other solids pumps may be used for the pump 129. Furthermore, the use of a throttling valve 125 is not required and a second pump may be substituted for the throttling valve 125 in some applications.

A suitable liquid for use in slurry formation should preferably provide a high heat transfer rate, a high hydrogen transfer rate, as well as a low heat capacity. Of course, the liquid used should not act as a poison or inhibitor to reduce the ability of the hydride-forming material to form and decompose hydrides. Promising liquids for use in slurry formation include benzene, cyclohexane, tetralin, and decalin, for example. Other compounds, including nonhydrocarbons, may also be used. Water is a powerful poison for many hydride-formers and should be excluded from the slurry in most cases.

Relatively small scale hydride heat and pressure pumps can be constructed using slurry pumps and solids pumps, and this is one of the principal advantages of these forms of hydride transport.

All of the hydride transport mechanisms described above may be applied in either continuous or moving batch hydride heat and pressure pumps. When operated as moving batch devices it is often preferable to combine two or more sets of reaction vessels which are operated in staggered phase to provide an approximation of continuous pumping.

Figure 7:
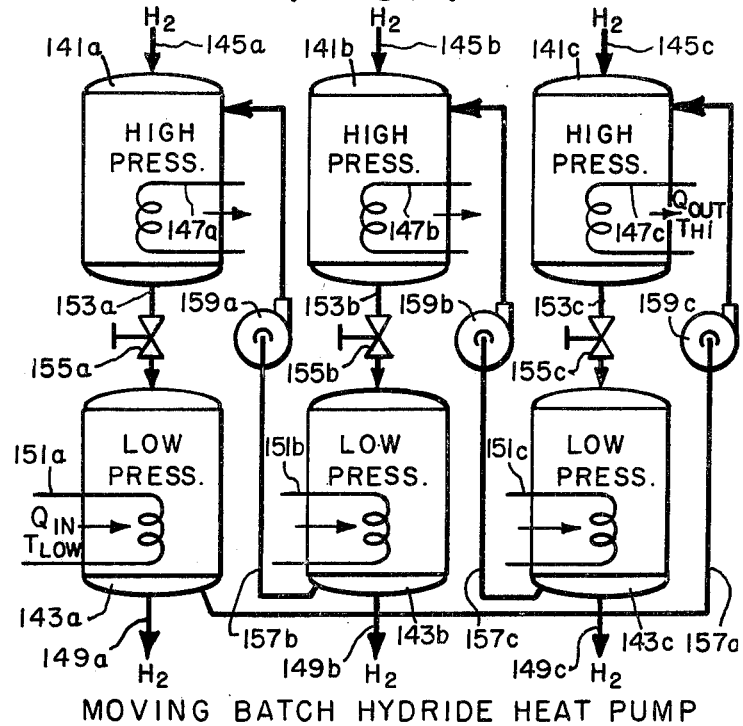
FIG. 7 is a flow diagram of a prefered embodiment of a moving batch hydride heat pump.

FIG. 7 shows a flow diagram of one such moving batch hydride heat pump. This pump is shown as using the slurry or solids pumping techniques described above in connection with FIG. 6, but, of course, other hydride transport mechanisms could be used as well. Three high pressure reactor vessels $141a,b,c$ are connected to three low pressure reactor vessels $143a,b,c$ by conduits $153a,b,c$, respectively. A throttling valve $155a,b,c$ is provided on each conduit $153a,b,c$ to control the flow of hydride-forming material into the associated low pressure vessel $143a,b,c$. Each of the high pressure vessels is supplied with high pressure via conduits $145a,b,c$ and acts as a heat source for high temperature heat which is removed via the heat exchangers $147a,b,c$, respectively. Similarly, heat exchangers $151a,b,c$ supply low temperature heat to the vessels $143a,b,c$ and low pressure hydrogen is drawn off through conduits $149a,b,c$, respectively. Conduits $157a,b,c$ interconnect the high and low pressure vessels as shown, and a slurry or solids pump $159a,b,c$ is provided in each conduit $157a,b,c$ to transport slurry from the low pressure vessel to the high pressure vessel in each case.

In operation, the moving batch hydride heat pump of FIG. 7 is operated with one reactor vessel empty so that at any given time hydride-forming material can be transferred from a specified vessel into the empty vessel. By sequentially transferring hydride-former into the vessel which is currently empty, the empty vessel moves around the system, thereby insuring that all hydride-former is periodically transferred from a low temperature/low pressure vessel to a high temperature/high pressure vessel and back.

For purposes of illustration, one cycle will be traced, starting with the vessel $141a$ empty. The cycle includes six steps. First, dehydride is pumped from vessel $143b$ into the empty vessel $141a$ via conduit $157b$ and slurry pump $159a$, thereby emptying vessel $143b$. Second, valve $155b$ is opened and high pressure hydride is allowed to pass into the empty low pressure vessel $143b$. Third, dehydride is pumped from vessel $143c$ into vessel $141b$. Fourth, high pressure hydride is passed from vessel $141c$ to vessel $143c$. Fifth, low pressure dehydride is pumped from vessel $143a$ to vessel $141c$. Sixth, high pressure hydride is passed from vessel $141a$ to vessel $143a$, thereby emptying vessel $141a$ and completing the cycle. At any given time in the cycle, two high pressure vessels contain batches of material which is exothermically absorbing hydrogen, two low pressure vessels contain batches of material which is endothermically desorbing hydrogen, and the two remaining pressure vessels are involved in the transport of hydride-forming material. Preferably, the transfer rate is chosen such that the period of the cycle is comparable to the time required for substantially completing the hydride and dehydride reactions in the reaction vessels.

Of course, the moving batch heat pump shown in FIG. 7 is merely illustrative and the same techniques may be used to build moving batch hydride pumps having a greater or lesser number of vessels. Some such pumps may advantageously employ more than one empty vessel so that transfer of hydride-forming material into several different vessels may be simultaneously undertaken. Such pumps may include counter current heat exchangers to increase operating efficiency. Similarly, not all such hydride pumps require multiple pumps $159a,b,c$, for in some applications a single pump which is coupled to each of the vessels and is provided with flow-directing valves may be used.

Furthermore, other transport methods can be used to move hydride-forming material between two thermal environments. For example, the hydride-forming material may be arranged in a movable container which is placed in a cavity inside a heat exchange column having at least two heat exchangers operating at different temperatures. The hydride-forming material may be heated or cooled as desired by appropriately positioning the container inside the heat exchange column adjacent the selected heat exchanger. The container is hydrogen permeable, and thermal insulators are preferably provided in the column between adjacent heat exchangers to reduce heat transfer. Suitable means for positioning the container inside the column include chain hoists and support rods.

The moving hydride heat pumps and pressure pumps of this invention can be used in a wide variety of applications. Hydride/dehydride cycles using a single species of hydride-forming material may be used to pump hydrogen when high temperature heat is available or to pump heat when high pressure hydrogen is available, as previously described. Alternately, two or more hydride/dehydride cycles using different hydride-forming materials may be combined for extended pumping range or to create a closed hydrogen loop in which hydrogen is transferred from one hydride/dehydride cycle to another. These and other applications are described below, and exemplary operating conditions are provided. It should be understood that both the continuous moving hydride systems and the moving batch systems described above may be used in these applications.

Hydrogen Pressure Pump

Several embodiments of single stage hydride pressure pumps have already been described, as, for example, in connection with FIGS. 2a, 4, and 6. Taking the pressure pump of FIG. 4 as an example, $LaNi_5$ can be used as the hydride-forming material and can, for example, be cycled between a high temperature of 195° C. and a low temperature of 30° C. The equilibrium hydrogen pressure for LaNi$_5$ is greater than 200 atmospheres at 195° C. and less than 10 atmospheres at 30° C. Thus, when LaNi$_5$ and the above-specified temperatures are used in connection with the device of FIG. 4, hydrogen gas may be thermochemically compressed in a single stage operation from less than 10 to greater than 200 atmospheres. This compressed hydrogen may be further compressed by supplying it as an input to a second stage hydride pressure pump utilizing a different range of thermal cycling or a different hydride-forming material, as described in greater detail below. The compressed hydrogen produced by a hydride pressure pump may be used to drive turbines or positive displacement engines for mechanical power generation.

Hydrogen Purification Pump

Figure 8:
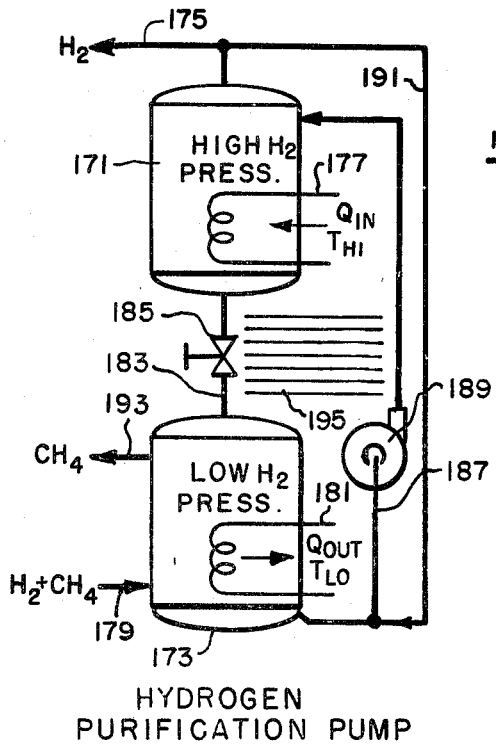
FIG. 8 is a flow diagram of a preferred embodiment of a moving hydride pressure pump arranged as a hydrogen purification pump.

With slight modification, a hydride-driven hydrogen pressure pump can be used as a hydrogen purification pump. Since hydride-forming materials selectively absorb hydrogen, a pressure pump can be operated to purify hydrogen to a high purity. FIG. 8 is a flow diagram for a preferred embodiment of a hydrogen purification pump.

Referring to FIG. 8, high and low pressure reactor vessels 171,173 are interconnected by conduits 183,187 which are provided with a throttling valve 185 and a solids pump 189, respectively. As before, high temperature heat is introduced to the high pressure vessel 171 via a heat exchanger 177 and high pressure hydrogen is removed via a conduit 175. Low pressure hydrogen is introduced to the low pressure vessel 173 by a conduit 179, and low temperature heat is removed through a heat exchanger 181. A counter current heat exchanger 195 thermally couples the hydride in the conduits 183,187 to improve operating efficiency.

Up to this point, this device is identical to the solids pump pressure pump of FIG. 6. Further features of the purification pump are conduits 191 and 193. Conduit 191 is provided to transport a small portion of the high pressure hydrogen from conduit 175 to a point in conduit 187 near the low pressure reaction vessel 173. The hydrogen in conduit 191 is used to backflush the hydride as it exits the low pressure vessel 173. Conduit 193 is an exit passage for gases that are introduced into the low pressure vessel 173 but not absorbed by the hydride-former.

In operation, a mixture of hydrogen and a diluent gas is introduced into the low pressure vessel 173 through conduit 179. This diluent gas can consist of any gas which neither poisons nor in absorbed by the hydride-forming material. Methane ($CH_4$) is one example of a suitable diluent gas. Other examples include other hydrocarbon compounds, such as butane, ethane, and ethylene, for example, and other nonhydrocarbons as well, such as helium. The hydride former selectively absorbs the hydrogen and is then transported by the solids pump to the high pressure reactor vessel 171, where it is heated and caused to desorb purified hydrogen. The diluent gas is substantially prevented from reaching the high pressure vessel 171 since it is not absorbed by the hydride-former. The backwash hydrogen introduced through conduit 191 further reduces the amount of diluent gas reaching the high pressure vessel 171. Diluent gas is vented from the low pressure vessel 173 through conduit 193.

It should be noted that it is the partial pressure of hydrogen, not the total pressure, which is important in determining the equilibrium temperature of a hydride-former in a particular environment. Therefore, the two reactor vessels 171,173 may be operated at the same pressure if the proper mixture of diluent gas and hydrogen is provided. For example, if the purification pump utilizes LaNi$_5$ and is cycled between the temperatures of 30° C. and 195° C., the equilibrium hydrogen pressures will be about 10 and 200 atmospheres, as discussed above. If the pressure of the mixture is about 200 atmospheres and the hydrogen concentration is such that the partial pressure of hydrogen is about 10 atmospheres, then hydrogen purification may be accomplished with both vessels 171,173 pressurized to a total pressure of about 200 atmospheres, and a relatively low pressure solids pump may be used.

Furthermore, the hydrogen purification pump is not limited to pressure pumps which desorb purified hydrogen at a higher pressure than the hydrogen partial pressure in the original mixture of hydrogen and diluent gas. Purification pumps can also be operated as heat pumps, where purified hydrogen is desorbed at a lower pressure than the hydrogen partial pressure in the mixture, and as transfer pumps, where the hydrogen partial pressure is substantially the same in the two reaction vessels.

Multiple Stage Pumps

The hydride pumps described above have been single stage pumps utilizing a single hydride-forming material. By proper selection of operating temperatures and pressures and hydride-forming materials, hydride pumps can be staged so that the output of a first hydride pump is applied as an input to a second hydride pump, and so on. In this way higher output temperatures and pressures can be achieved for a given set of operating conditions than would otherwise be possible.

Figure 9:
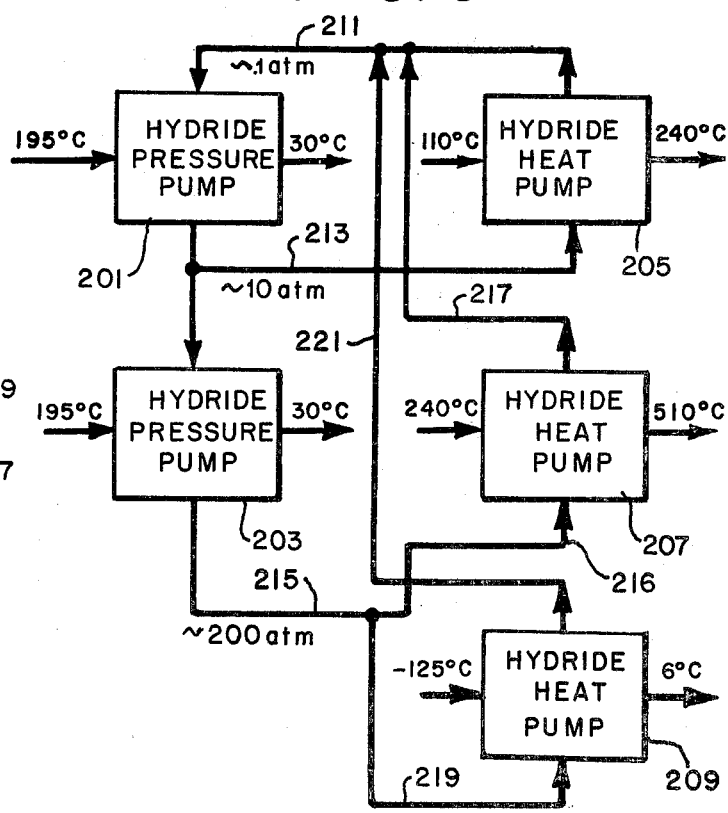
FIG. 9 is a schematic diagram of a multiple stage moving hydride pump employing both pressure staging and temperature staging.

FIG. 9 is a schematic flow diagram of a multiple stage hydride pump which employs two hydride pressure pumps 201,203 and three hydride heat pumps 205,207,209. The hydride pumps previously described in connection with FIGS. 4–7 may be used in the embodiment of FIG. 9, and, therefore, hydride heat pumps 201–209, are only shown schematically.

Hydride pumps 201,203 will be considered first. These two pressure pumps each utilize two heat reservoirs, one at 195° C., the other at 30° C., to pressurize hydrogen gas. Pump 201 in this example utilizes LaNi$_{4.3}$Al$_{0.7}$ as the hydride-forming material, which will draw hydrogen at a pressure of less than 0.1 atmospheres and desorb hydrogen at a pressure greater than 10 atmospheres when cycled between the temperatures stated above. Pump 203 employs a second hydride-former LaNi$_5$, which will draw hydrogen at a pressure less than 10 atmospheres and compress it to a pressure greater than 200 atmospheres at the stated temperatures. Pumps 201,203 operate to provide compressed hydrogen at 10 and 200 atmospheres which can be used to drive hydride heat pumps or to generate mechanical power.

Hydride heat pump 209 is one example of a hydride pump driven by compressed hydrogen supplied by the pressure pumps 201,203. High pressure hydrogen at a pressure in excess of 200 atmospheres is supplied to pump 209 via conduits 215,219, and low pressure hydrogen is drawn off via conduit 221 at a pressure less than 0.1 atmospheres. The hydride-former in pump 209 is TiCr$_2$, which will act as a heat sink at about −125° C. and as a heat source at about 6° C. when cycled between 200 and 0.1 atmospheres. The pump 209 utilizes high pressure hydrogen to cool a refrigeration load to a temperature of about −125° C. and to reject this heat at about 6° C. in a single heat pump stage.

Hydride heat pumps 205,207 are staged to use compressed hydrogen to pump heat energy to a higher temperature than any of the input heat sources or sinks. In this example, heat pump 205 is driven by hydrogen compressed to about 10 atmospheres supplied by conduit 213. The hydride-former in pump 205 of this example is $LaNi_4Al_1$, which will exothermically absorb hydrogen at about 10 atmospheres while giving off heat at about 240° C. When this hydride-former is cooled to about 110° C. and heat is further added at this temperature, previously absorbed hydrogen will be desorbed at a pressure less than about 0.1 atmosphere. This low pressure hydrogen is returned to pump 201 via conduit 211 for recompression.

The heat energy rejected by pump 205 at about 240° C. is supplied to heat pump 207 to cause desorption of hydrogen. Pump 207 uses $Mg_2Ni$ as a hydride-former. Hydrogen is supplied at about 200 atmospheres via conduits 216,215 and is drawn off at about 0.1 atmospheres by conduit 217. Heat is supplied to the pump 207 at about 240° C. and is pumped to a temperature greater than 510° C. Thus, the pumps 205,207 operate in combination with the pumps 201,203 to utilize heat sources at about 110° C. and 195° C. and a heat sink at about 30° C. to pump heat to a temperature greater than 510° C. Other heat pump stages could be added to pump the heat at 6° C. output by the heat pump 209 up to 110° C., the input temperature of pump 205, to create a multiple stage heat pump acting to pump heat energy from −125° C. to over 510° C.

The multiple stage hydride pump shown in FIG. 9 provides only one example of staged hydride pump, and is not to be taken as limitative. The hydride-forming materials mentioned can be operated between pressures and temperatures other than those described, and other hydride-forming materials suitable for use in these or other ranges of temperature and pressure can be used. Additional stages of either heat or pressure pumping can be added. In all cases, the particular hydride-former and operating conditions should be chosen to fit the intended application.

Multiple stage hydride pumps can be advantageously used as topping and bottoming cycles in connection with power generation. Though fuels can be combusted at temperatures of 3,000° F. or higher, the heat is often employed in power cycles at temperatures of 1,000° F. or lower. In such power cycles, the high quality of the input heat is utilized only for the temperature driving force that it provides in heat transfer. Otherwise, the high quality of the input heat is not used in the power generation cycle and a simple entropy increasing step precedes its application. Similarly, the exhaust temperature of a power generation cycle may be considerably higher than ambient temperature. Through the proper selection of operating conditions and hydride-forming materials, heat pumps can be designed to utilize these otherwise unused temperature differences to drive topping and bottoming cycle heat pumps and thereby to improve the overall efficiency of the cycle. For example, given a power generating cycle that operates between temperatures $T_a$ and $T_b$, a heat source at $T_1$, and a heat sink at $T_2$ (where $T_1 > T_a > T_b > T_2$), moving hydride heat pumps can be driven by the temperature difference $T_1 - T_a$ in a topping cycle and the difference $T_b - T_2$ in a bottoming cycle. When heat pumps are used in topping and bottoming cycles, the temperature range of the power generating cycle can be optimized for maximum efficiency and temperature ranges narrower than those commonly used in the past may be used with improved overall operating efficiencies.

The hydride pumps of this invention can also be used in relatively small scale applications, as, for example, in connection with the solar heating and cooling of dwellings and other structures. Solar collectors can be constructed which convert incident sunlight into low grade heat. The temperature difference between this low grade heat and ambient temperature can be used to drive a hydride heat pump. By proper selection of the hydride-forming material and operating conditions, almost any temperature difference which extends over a minimum temperature range can be harnessed to drive a hydride heat pump.

The continuous and moving batch hydride pumps disclosed herein can be used to pump heat or hydrogen gas without major thermal cycling of the reactor vessels used to contain the hydride-former. These hydride pumps are an improvement over the hydride pumps of the prior art in that they operate with improved thermodynamic efficiency and reduced thermal cycling of major components such as reactor vessels. Furthermore, the continuous hydride pumps disclosed herein provide steady, continuous pumping action without the complexity of multiple staggered cycle reactor vessels and surge tanks.

Although certain preferred embodiments of the invention have been described in order to illustrate the principles of the invention, it should be understood that various changes and modifications to the described embodiments can be made, and will be apparent to those skilled in the art. Such changes and modifications can be made without departing from the basic principles of the invention, and without diminishing its attendant advantages. It is, therefore, intended that such changes and modifications be covered by the following claims.

We claim:

1. An apparatus for cycling a hydride-forming material between a first temperature and a second temperature comprising:
   a plurality of reaction zones for containing the hydride-forming material, said plurality including first and second reaction zones;
   means for supplying heat at the first temperature to the first reaction zone to promote the desorption of hydrogen from hydride-forming material in the first reaction zone;
   means for supplying hydrogen to the second reaction zone;
   means for removing hydrogen from the first reaction zone;
   means for removing heat at the second temperature from the second reaction zone to promote the absorption of hydrogen by hydride-forming material in the second reaction zone;
   transport means including first means for transporting hydride-forming material which has been at least partially dehydrided in the first reaction zone from the first reaction zone to the second reaction zone;
   second means, included in the transport means, for transporting hydride-forming material which has been at least partially hydrided in the second reaction zone from the second reaction zone to at least one other reaction zone, said first and second means cooperating to cycle hydride-forming material between the first and second reaction zones while permitting the first and second reaction zones to be maintained at substantially constant temperature.

2. The apparatus of claim 1 wherein the transport means operates to continuously transport hydride-forming material in order to permit continuous desorption of hydrogen in the first reaction zone and continuous absorption of hydrogen in the second reaction zone.

3. The apparatus of claim 1 wherein the transport means operates to transport hydride-forming material as a batch between the first and second reaction zones.

4. The apparatus of claim 1 wherein the transport means utilizes fluidized flow to transport hydride-forming material.

5. The apparatus of claim 1 wherein a slurry is formed containing the hydride-forming material for transport.

6. The apparatus of claim 1 wherein a solids pump is used to transport the hydride-forming material.

7. The apparatus of claim 1 further including means for thermally coupling hydride-forming material transported by the first means with hydride-forming material transported by the second means to promote heat transfer therebetween.

8. The apparatus of claim 7 wherein the means for thermally coupling includes a counter current heat exchanger.

9. A method for thermally cycling a hydride-forming material between a first temperature and a second temperature in a hydride pump, said pump including a plurality of reaction zones comprising first and second reaction zones, wherein the method comprises the following steps:
supplying heat at the first temperature to hydride-forming material in the first reaction zone to promote desorption of hydrogen;
removing hydrogen from the first reaction zone;
transporting at least partially dehydrided hydride-forming material from the first reaction zone to the second reaction zone;
supplying hydrogen to the second reaction zone;
removing heat at the second temperature from hydride-forming material in the second reaction zone to promote absorption of hydrogen; and
transporting at least partially hydrided hydride-forming material from the second reaction zone to at least one other reaction zone such that hydride-forming material is cyclically transported between the first and second reaction zones.

10. The method of claim 9 wherein hydride-forming material is transported between the first and second reaction zones in a continuous flow in order to permit continuous desorption of hydrogen in the first reaction zone and continuous absorption of hydrogen in the second reaction zone.

11. The method of claim 9 wherein the hydride-forming material is transported between the first and second reaction zones in a batch flow.

12. The method of claim 9 wherein the hydride-forming material is fluidized for transport between the first and second reaction zones.

13. The method of claim 9 wherein a slurry is formed containing the hydride-forming material for transport between the first and second reaction zones.

14. The method of claim 9 wherein a solids pump is used to transport the hydride-forming material between the first and second reaction zones.

15. The method of claim 9 further including the step of providing a thermal link between hydride-forming material transported from the first reaction zone to the second reaction zone and hydride-forming material transported from the second reaction zone to at least one other reaction zone to promote heat transfer therebetween.

16. A hydride pump comprising:
a plurality of reaction zones, including first and second reaction zones;
first means for transporting hydride-forming material from the first reaction zone to the second reaction zone;
second means for transporting hydride-forming material from the second reaction zone to at least one other reaction zone such that hydride-forming material is cycled between the first and second reaction zones;
means for maintaining the first reaction zone at a substantially constant temperature and pressure for a period greater than the time required for the first and second transporting means to transport hydride-forming material in a complete cycle from the first reaction zone to the second reaction zone and back, including residence time in the first reaction zone;
means for maintaining the second reaction zone at a substantially constant temperature and pressure for a period greater than the time required for the first and second transporting means to transport hydride-forming material in a complete cycle from the second reaction zone to the first reaction zone and back, including residence time in the second reaction zone.

17. The hydride pump of claim 16 further including means for conducting heat energy between hydride-forming material being transported by the first and second transporting means.

18. An apparatus for transferring heat energy from a first temperature to a second, higher temperature comprising:
first reactor means for containing hydride-forming material, said first reactor means including means for drawing off hydrogen at a first pressure and means for supplying heat at the first temperature;
second reactor means for containing hydride-forming material, said second reactor means including means for supplying hydrogen at a second pressure higher than the first pressure and means for drawing off heat at the second temperature;
first and second conduit means extending between the first and second reactor means for transporting hydride-forming material therebetween;
throttling means in the first conduit means for controlling the rate at which hydride-forming material moves through the first conduit means from the second reactor means to the first reactor means; and
pump means in the second conduit means for transporting hydride-forming material from the first reactor means to the second reactor means in a substantially continuous stream, said first and second conduit means, throttling means, and pump means cooperating to continuously cycle hydride-forming material between the first and second reactor means to promote continuous exothermic hydride formation in the second reactor means and continuous endothermic hydride decomposition in the first reactor means.

19. An apparatus for transferring hydrogen from a first reactor means to a second reactor means comprising:
- first reactor means for containing hydride-forming material, said first reactor means including means for supplying hydrogen at a first pressure and means for drawing off heat at a first temperature;
- second reactor means for containing hydride-forming material, said second reactor means including means for drawing off hydrogen at a second pressure and means for supplying heat at a second temperature;
- first and second conduit means extending between the first and second reactor means for transporting hydride-forming material therebetween;
- throttling means in the first conduit means for controlling the rate at which hydride-forming material is transported from the second reactor means to the first reactor means through the first conduit means; and
- pump means in the second conduit means for transporting hydride-forming material from the first reactor means to the second reactor means in a substantially continuous stream, said first and second conduit means, throttling means, and pump means cooperating to continuously cycle hydride-forming material between the first and second reactor means to promote continuous absorption of hydrogen in the first reactor means and continuous desorption of hydrogen in the second reactor means.

20. The apparatus of claim 19 wherein the second pressure is higher than the first pressure and the apparatus operates as a hydrogen pressure pump.

21. The apparatus of claim 18 or 19 wherein the first conduit means includes a standpipe, the pump means includes a bubble lift, and the hydride-forming material is transported as a fluidized solid.

22. The apparatus of claim 18 or 19 wherein the pump means includes a slurry pump and the hydride-forming material is transported as a slurry.

23. The apparatus of claim 18 or 19, wherein the pump means includes a solids pump.

24. An apparatus for transferring heat energy from a first temperature to second, higher temperature comprising:
- first reactor means for containing hydride-forming material, said first reactor means including means for drawing off hydrogen at a first pressure and means for supplying heat at the first temperature;
- second reactor means for containing hydride-forming material, said second reactor means including means for supplying hydrogen at a second pressure higher than the first pressure and means for drawing off heat at the second temperature;
- first means for transporting substantially all of the hydride-forming material contained in the first reactor means as a batch to the second reactor means;
- second means for transporting substantially all of the hydride-forming material contained in the second reactor means as a batch to the first reactor means.

25. An apparatus for transferring hydrogen from a first reactor means to a second reactor means comprising:
- first reactor means for containing hydride-forming material, said first reactor means including means for supplying hydrogen at a first pressure and means for drawing off heat at a first temperature;
- second reactor means for containing hydride-forming material, said second reactor means including means for drawing off hydrogen at a second pressure and means for supplying heat at a second temperature;
- first means for transporting substantially all of the hydride-forming material contained in the first reactor means as a batch to the second reactor means; and
- second means for transporting substantially all of the hydride-forming material contained in the second reactor means as a batch to the first reactor means.

26. The apparatus of claim 25 wherein the second pressure is higher than the first pressure and the apparatus operates as a hydrogen pressure pump.

27. The apparatus of claim 24 or 25 wherein the first transporting means includes a standpipe, the second transporting means includes a bubble lift, and the hydride-forming material is transported as a fluidized solid.

28. The apparatus of claim 24 or 25 wherein the first transporting means includes a slurry pump and the hydride-forming material is transported as a slurry.

29. The apparatus of claim 24 or 25 wherein the first transporting means includes a solids pump.

30. The apparatus of claim 24 or 25 wherein the first and second transporting means each includes at least one additional reactor means.

31. An apparatus for transferring heat energy from a first temperature to a second, higher temperature comprising:
- a first reactor vessel for containing hydride-forming material;
- a second reactor vessel situated above the first vessel for containing hydride-forming material;
- first and second heat exchangers for supplying heat to the first vessel at the first temperature and drawing off heat from the second vessel at the second temperature, respectively;
- first and second hydrogen supply means for drawing off hydrogen at a first pressure from the first vessel and supplying hydrogen at a second, higher pressure to the second vessel;
- a standpipe connected between the first and second vessels for transporting hydride-forming material from the second vessel downwards to the first vessel;
- throttling means in the standpipe for restricting the flow of hydride-forming material down the standpipe;
- a bubble lift connected between the first and second vessels for transporting hydride-forming material up from the first vessel to the second vessel;
- means for maintaining fluidized flow in the hydride-forming forming material contained in the standpipe and the bubble lift; and
- means for forming bubbles in the bubble lift to promote the upward movement of hydride-forming material in the bubble lift.

32. An apparatus for transferring hydrogen from a first reactor vessel to second reactor vessel comprising:
- a first reactor vessel for containing hydride-forming material;

a second reactor vessel situated above the first vessel for containing hydride-forming material;

first and second heat exchangers for drawing off heat from the first vessel at a first temperature and supplying heat to the second vessel at a second temperature, respectively;

first and second hydrogen supply means for supplying hydrogen at a first pressure to the first vessel and drawing off hydrogen at a second pressure from the second vessel;

a standpipe connected between the first and second vessels for transporting hydride-forming material from the second vessel downwards to the first vessel;

throttling means in the standpipe for restricting the flow of hydride-forming material down the standpipe;

a bubble lift connected between the first and second vessels for transporting hydride-forming material up from the first vessel to the second vessel;

means for maintaining fluidized flow in the hydride-forming material contained in the standpipe and the bubble lift; and means for forming bubbles in the bubble lift to promote the upward movement of hydride-forming material in the bubble lift.

33. The apparatus of claim 32 wherein the second pressure is higher than the first pressure and the apparatus operates as a hydrogen pressure pump.

34. The apparatus of claim 31 or 32 wherein the bubble forming means includes means for injecting a fluid into the bubble lift.

35. The apparatus of claim 31 or 32 wherein the bubble forming means includes means for heating a portion of the hydride-forming material contained in the bubble lift to promote hydrogen desorption and bubble formation.

36. An apparatus for transferring heat energy from a first temperature to a second, higher temperature, comprising:

first and second reactor vessels for containing hydride-forming material;

first and second heat exchangers for supplying heat to the first vessel at the first temperature and drawing off heat from the second vessel at the second temperature, respectively;

first and second hydrogen supply means for drawing off hydrogen at a first pressure from the first vessel and supplying hydrogen at a second, higher pressure to the second vessel;

first means for transporting hydride-forming material between the first and second vessels, including a lock hopper for containing hydride-forming material;

first and second conduits interconnecting the lock hopper with the first and second valves, respectively;

first and second valves connected to the first and second conduits, respectively, for controlling the flow of hydride-forming material therethrough; and second means for transporting hydride-forming material between the first and second vessels.

37. An apparatus for transferring hydrogen from a first reactor vessel to a second reactor vessel comprising:

first and second reactor vessels for containing hydride-forming material, first and second heat exchangers for drawing off heat from the first vessel at a first temperature and supplying heat to the second vessel at a second temperature, respectively;

first and second hydrogen supply means for supplying hydrogen at a first pressure to the first vessel and drawing off hydrogen at a second pressure from the second vessel;

first means for transporting hydride-forming material between the first and second vessels, including a lock hopper for containing hydride-forming material;

first and second conduits interconnecting the lock hopper with the first and second valves, respectively;

first and second valves connected to the first and second conduits, respectively, for controlling the flow of hydride-forming material therethrough; and second means for transporting hydride-forming material between the first and second vessels.

38. The apparatus of claim 37 wherein the second pressure is higher than the first pressure and the apparatus operates as a hydrogen pressure pump.

39. The apparatus of claim 36 or 37 wherein the first vessel is situated above the lock hopper which is in turn situated above the second vessel to permit the hydride-forming material to flow under the force of gravity from the first vessel into the lock hopper and then from the lock hopper into the second vessel.

40. The method of claim 12 wherein hydrogen is the fluidizing medium.

* * * * *

Disclaimer 4,178,987.—*Walker H. Bowman*, St. Charles and *Bruce E. Sirovich*, Naperville, Ill. MOVING BED HYDRIDE/DEHYDRIDE SYSTEMS. Patent dated Dec. 18, 1979. Disclaimer filed Apr. 22, 1982, by the assignee, *Standard Oil Co.*

Hereby enters this disclaimer to claims 1-15 and 40 of said patent.
[*Official Gazette July 6, 1982.*]